United States Patent
Tobayama et al.

(10) Patent No.: US 6,244,408 B1
(45) Date of Patent: Jun. 12, 2001

(54) ROTARY MACHINE HAVING SINGLE ROW FOUR CONTACT POINT BEARING

(75) Inventors: Masashi Tobayama, Chiryu; Yasuo Tabuchi, Toyoake, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/447,426

(22) Filed: Nov. 23, 1999

(30) Foreign Application Priority Data

Dec. 9, 1998 (JP) .................................... 10-350308

(51) Int. Cl.$^7$ ..................................................... F16D 19/00
(52) U.S. Cl. .............................. 192/84.961; 192/110 B; 384/516
(58) Field of Search ........................ 192/84.961, 110 B; 384/516

(56) References Cited

U.S. PATENT DOCUMENTS

| | | |
|---|---|---|
| 3,762,516 * | 10/1973 | Matsushita et al. ............ 192/84.961 |
| 4,210,890 | 7/1980 | Olsen . |
| 5,232,076 * | 8/1993 | Nakagawa et al. ............. 192/84.961 |
| 6,010,420 * | 1/2000 | Niki et al. ............................. 474/199 |
| 6,116,786 * | 9/2000 | Takata et al. ........................ 384/516 |

FOREIGN PATENT DOCUMENTS

| | | |
|---|---|---|
| 19633699 | 2/1997 | (DE) . |
| 6-66330 | 3/1994 | (JP) . |
| 9-119510 * | 5/1997 | (JP) . |

* cited by examiner

*Primary Examiner*—Richard M. Lorence
(74) *Attorney, Agent, or Firm*—Pillsbury Winthrop LLP

(57) ABSTRACT

A bearing used for an electromagnetic clutch includes an inner race, an outer race, and a plurality of balls provided between the inner and outer races. The plurality balls are arranged in single row, and each of the balls contacts both inner and outer races at two contact points, respectively. Thus, even when the outer race inclines due to an external force, each ball continuously contacts both the inner race and the outer race at at least one point, respectively. Accordingly, the balls do not fall due to gravity, thereby preventing noise generated by balls falling and colliding with the races.

6 Claims, 5 Drawing Sheets

ROTARY MACHINE HAVING SINGLE ROW FOUR CONTACT POINT BEARING

CROSS REFERENCE TO RELATED APPLICATION

This Application is based on and incorporates herein by reference Japanese Patent Application No. Hei. 10-350308 filed on Dec. 9, 1998.

BACKGROUND OF THE INVENTION

1. Field of the Invention

The present invention relates to a rotary machine and an electromagnetic clutch suitable for use in a compressor of an automotive air conditioning system, and a belt transmission adjusting the driving belt tension of a vehicle.

2. Description of Related Art

FIG. 4 shows a conventional electromagnetic clutch 100 used for a compressor of an automotive air conditioner. The electromagnetic clutch 100 includes a pulley 101, a rotor 102, an electromagnetic coil 103, an armature 104 and a hub 105. The pulley 101 and the rotor 102 rotates by receiving a rotational force from a vehicle engine through a belt 110, and the armature 104 is placed to face the rotor 102 with a predetermined slight gap therebetween. The armature 104 is connected to a compressor shaft 121 through the hub 105. When the electromagnetic coil 103 is energized, the armature 104 couples to the rotor 102, and the rotation of the rotor 102 is transmitted to the compressor shaft 121 through the armature 104 and the hub 105.

A bearing 106 is provided between the inner periphery of the rotor 102 and a cylindrical boss portion 122 of the compressor 120. The bearing 106 rotatably supports the rotor 102.

In general, the bearing 106, used in the electromagnetic clutch of the compressor, is a double row angular contact ball bearing. Such a bearing 106 includes an inner race 106a, an outer race 106b, and a plurality of balls 106c arranged in double rows between the inner and outer races 106a and 106b, and has a contact angle α. Each ball 106c contacts both inner and outer races 106a, 106b at one point respectively. Here, in FIG. 5, numerals 201–208 denote the contact points between the balls 106c and the inner and outer races 106a, 106b.

However, in the above described electromagnetic clutch, the bearing 106 creates unwanted noise. This bearing noise especially occurs when the rotation speed of the compressor 120 is low, the temperature around the compressor 120 is low, grease in the bearing 106 leaks, or the viscosity of the grease is low.

As shown in FIG. 4, an action line E of a tension D of the belt 110 axially diverts from the radial central line F of the bearing 106. In the bearing 106, slight gaps (about 40μ) are provided between the balls 106c and the inner and outer races 106a, 106b in the radial direction. Thus, a moment caused by the tension D of the belt 110 makes the outer race 106b incline in the counter clockwise direction. Similarly, the pulley 101 and the rotor 102 are made to incline.

Here, as the balls 106c are arranged in double row, even when the outer race 106b inclines, the top ball 106c in the left row in FIG. 5 contacts both inner and outer races 106a, 106b at the contact points 201, 202. Similarly, the bottom ball 106c in the right row contacts both inner and outer races 106a, 106b at the contact points 207, 208.

However, when the outer race 106b inclines in the counter clockwise direction in FIG. 5, gaps between the inner and outer races 106a and 106b expand at the lower left row and the upper right row. Thus, as shown in FIG. 6, gaps occur between the lower side ball 106c' and the inner and outer races 106, 106b at the left row, and the lower side ball 106c' rotates in accordance with the outer race 106b rotating in an arrow G direction. As a result, the lower side ball 106c' falls from the inner race 106a to the outer race 106b due to the gravity and centrifugal forces, and collides with the outer race 106b, thereby creating unwanted noise.

Additionally, as shown in FIG. 7, there arise gaps between the upper side ball 106c" and the inner and outer races 106a at the right row. Thus, the upper side ball 106c" falls due to gravity and collides with the inner race 16a, also creating unwanted noise.

When the vehicle engine operates at high rotation speed, the centrifugal force increases, so that the balls 106c always contact the outer race 106b. Thus, the noise caused by the collisions between the balls 106c and the races 106a, 106b is not generated. Therefore, the above described noise problem especially exists when the bearing 106 is used at a low rotation speed, or is used with a rotation source operating from a low rotation speed through a high rotation speed, such as on a vehicle engine.

SUMMARY OF THE INVENTION

An object of the present invention is to provide a rotary machine, especially an electromagnetic clutch, being capable of preventing the noise caused by the collision between ball bearings and inner and outer races of a bearing assembly.

According to a first aspect of the present invention, a bearing used for a rotary machine includes an inner race, an outer race, and a plurality of balls provided between the inner and outer races. The plurality of balls are arranged in single row, and each of the balls contacts both inner and outer races at two contact points respectively.

Thus, even when the outer ring inclines due to an external force, although each ball detaches from the inner race at one contact point, it continuously contacts the inner race at the other contact point. Similarly, although each ball detaches from the outer race at one contact point, it continuously contacts the other contact point.

Accordingly, the ball does not fall due to the gravity, thereby preventing generation of the noise caused by the collision between the ball and the races.

According to a second aspect of the present invention, radius of curvatures of the raceway surfaces, which contact the ball, are larger than the radius of the ball at portions where the raceway surfaces contact the ball.

Thus, each ball can contact both inner and outer races at two contact points respectively.

According to a third aspect of the present invention, a space between the inner and outer races, where the ball is disposed, is sealed by a seal member, and grease is charged into the space.

The grease works as a cushion between the balls and the inner and outer races to reduce a noise caused by collision between the balls and the races. Further, the space to which the grease is charged is sealed by the seal member, so that the grease does not leak, thereby continuously reducing the noise.

According to a fourth aspect of the present invention, an action line of the external force axially diverts from a radial central line. Thus, when the outer race inclines, the ball contacts both inner and outer races at least at one point respectively.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

Figure 1:
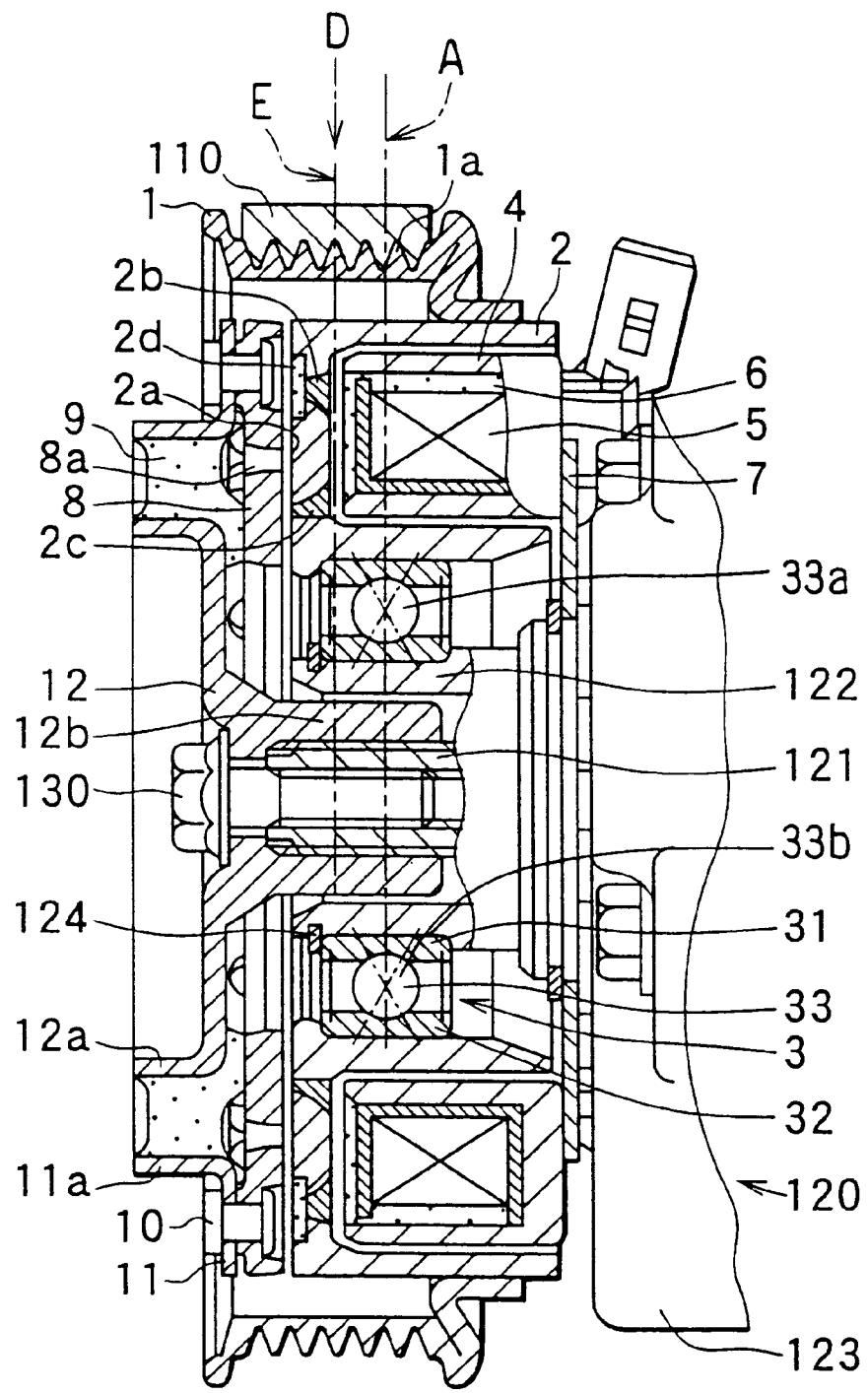
FIG. 1 is a cross-sectional view showing an electromagnetic clutch according to the present invention.

In the preferred embodiment, an electromagnetic clutch is attached to a refrigerant compressor 120 of an automotive air conditioning system. FIG. 1 shows a cross-sectional view of the electromagnetic clutch.

The electromagnetic clutch includes a pulley 1, a rotor 2, a bearing 3, a coil housing 4, an electromagnetic coil 5, an armature 8, and a hub 12. The pulley 1 rotates by receiving a rotational force from the vehicle engine through a multistage V-belt 110. The pulley 1 is made of iron and includes a pulley portion 1a having multistage V-grooves around which the multistage V-belt 110 is wrapped. The rotor 2 is made of magnetic material such as iron, and is formed into a cross-sectional U-shape. The pulley 1 is welded to the rotor 2, so that the pulley 1 and the rotor 2 rotate together. The bearing 3 is press-inserted into the inner periphery of the rotor 2. The rotor 2 is rotatably supported on a cylindrical boss portion 122 of an aluminum front housing 123 of the compressor 120 through the bearing 3. The bearing 3 is fitted to the outer periphery of the boss portion 122, and is positioned and fixed by a clip 124.

The coil housing 4 is made of magnetic material such as iron, and formed into a double cylindrical cross-sectional U-shape. The electromagnetic coil 5 is installed in the coil housing 4 and fixed by a resin member 6 so that it is insulated from the coil housing 4. The resin member 6 is made by injecting a resin material such as epoxy or unsaturated polyester, which can be formed under relatively low temperature (130–140° C.), into the inside space of the coil housing 4.

The coil housing 4 is disposed in the cross-sectional U-shaped rotor 4 with a slight gap therebetween. A ring-shaped stay 7 made of iron is spot-welded to the back surface of the coil housing 4. Thus, the coil housing 4 is fixed to the front housing 123 of the compressor 120 through the stay 7.

The rotor 2 includes a friction surface 2a extending radially, and the friction surface 2a includes arc-shaped magnetic interruption slots 2b and 2c. Further, a friction member 2d is provided in the outer slot 2b to improve torque transmission.

The armature 8 is placed opposite a friction surface 2a with a predetermined slight gap (for example, 0.5 mm). The armature 8 is made of magnetic material such as iron and formed into a ring-like shape. When the electromagnetic coil 5 is not energized, an elastic member 9 elastically holds the armature 8 to have the predetermined slight gap with respect to the friction surface 2a of the rotor 2. The armature 8 also includes an arc-shaped magnetic interruption slot 8a.

The rotor 2, the coil housing 4 and the armature 8 construct a magnetic circuit through which a magnetic flux caused by the electromagnetic coil 5 flows.

A rivet 10 fixes the armature 8 to a ring-shaped supporter 11. The rivet 10 and the supporter 11 are made of iron.

The armature 8 is coupled to the rotor 2 by an electromagnetic force generated in the electromagnetic coil 5. The hub 12 is connected with the armature 8 and rotates therewith.

The elastic member 9 is cylindrically shaped and disposed between the supporter 11 and the hub 12. The elastic member 9 is made of rubber material, which efficiently transmits torque and absorbs torque vibration (damping vibration) within the temperature range where a vehicle is used, such as butyl rubber chloride, acrylonitrile-butadiene rubber and ethylene propylene rubber.

The hub 12 is made of iron, and connected to a rotational shaft 121 of the refrigerant compressor 120, and transmits a rotation force to the compressor 120. The hub 12 includes a central cylindrical portion 12b, and the rotational shaft 121 is spline-connected to the inner periphery of the central cylindrical portion 12b. The hub 12 is fixed and tightened to the rotational shaft 121 by a bolt 130.

The elastic member 9 is disposed between the inner periphery of cylindrical portion 11a of the supporter 11 and the outer periphery of outer cylindrical portion 12a of the hub 12, and is integrally connected to the supporter 11 and the hub 12.

The bearing 3 is a single row, four contact point bearing.

Figure 2:
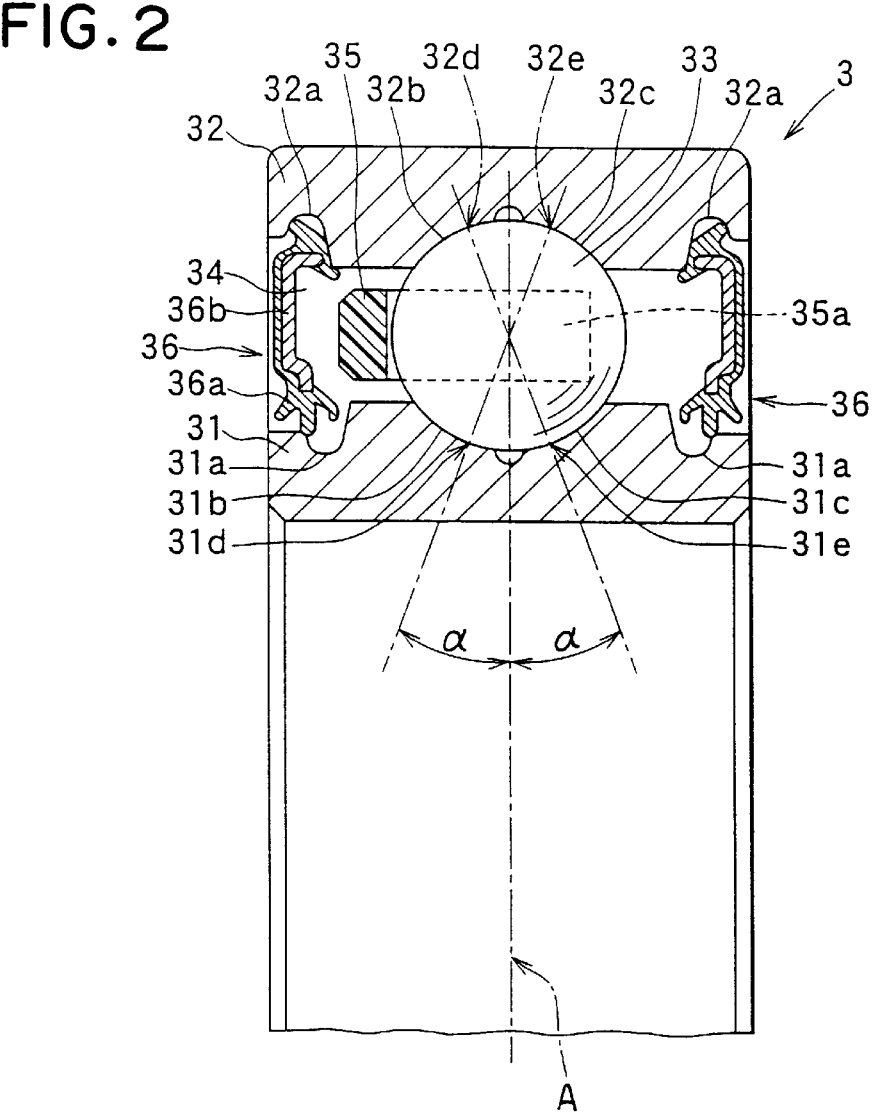
FIG. 2 is an enlarged cross-sectional view showing a bearing according, to the present invention.

As shown in FIG. 2, an inner race 31 and an outer race 32 are concentrically disposed, and a plurality of balls 33 are arranged to make a single row in a ring-shaped space 34 between the inner and outer races 31 and 32.

A ring-shaped retainer 35 is provided in the space 34, and includes a plurality of holes 35a arranged ciucumferentially at uniform intervals. The balls 33 are freely installed into the holes 35a so that the balls 33 are arranged ciucumferentially at uniform intervals. The inner and outer races 31, 32 and the balls 33 are made of high-carbon chrome bearing steel (SUJ2), and the retainer 35 is made of nylon which has sufficiently high strength and is easily formed.

The inner and outer races 31 and 32 include grooves 31a and 32a at both sides thereof respectively. An oil-seal 36 including a lip 36a and a plate 36b is installed in the grooves 31a and 32a. The lip 36a is made of rubber having sufficiently high oil resistance and high heat resistance, such as nitrile rubber, and the plate 36b is made of metal. The space 34 is sealed by the oil-seal 36, and grease is charged into the space 34.

For allowing each ball 33 to contact the inner race 31 and outer race 32 at two points respectively, the inner and outer races 31 and 32 are formed as follows.

Figure 3:
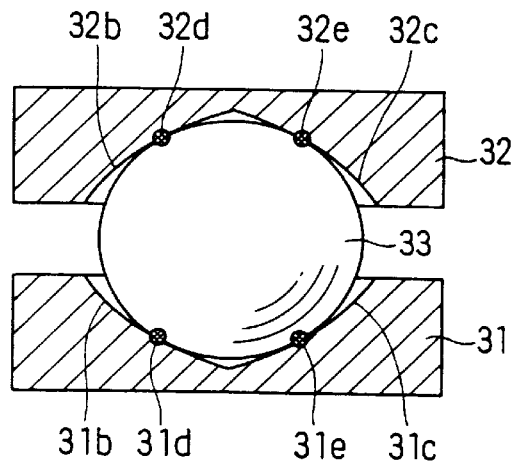
FIG. 3 is a partial enlarged view of FIG. 2.
Figure 4:
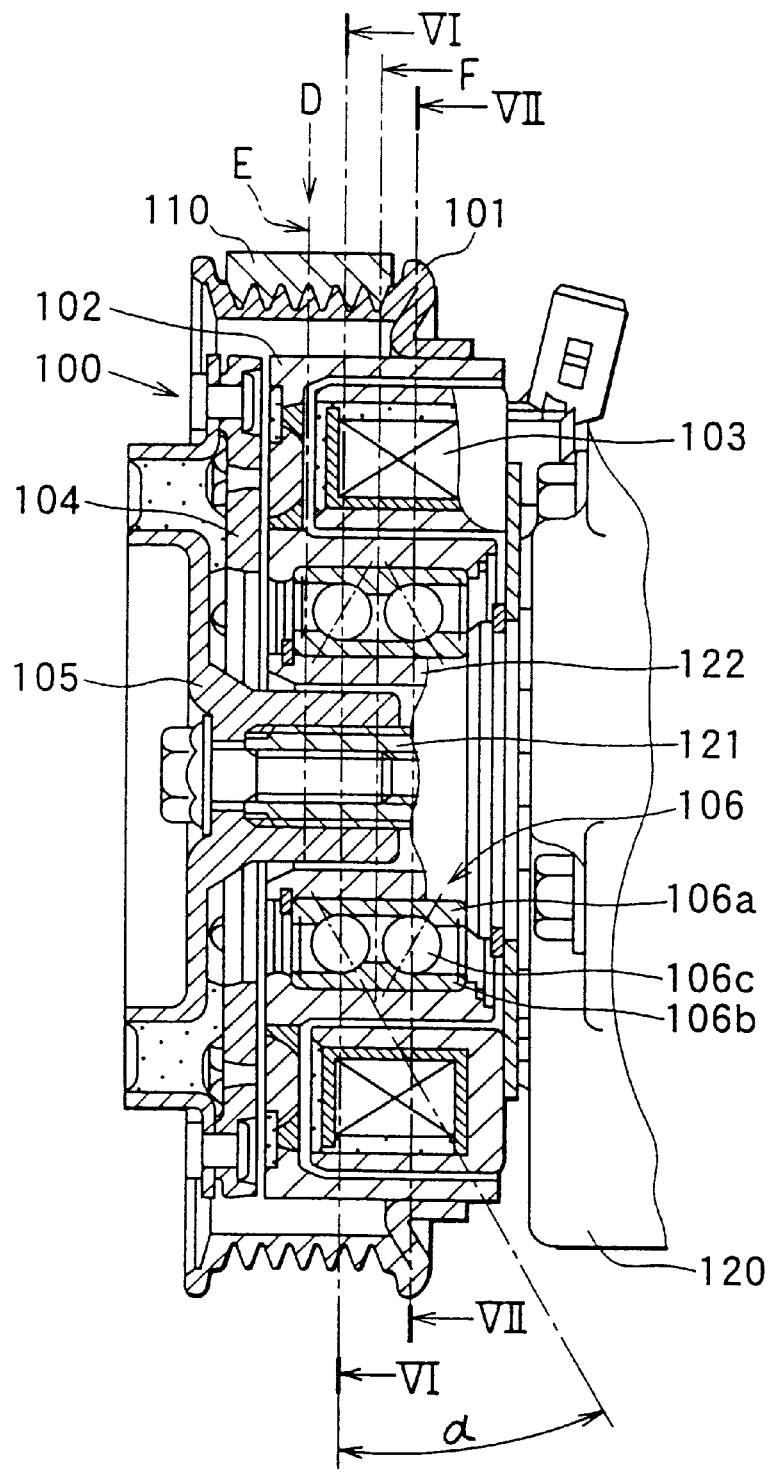
FIG. 4 is a cross-sectional view showing a prior art electromagnetic clutch.
Figure 5:
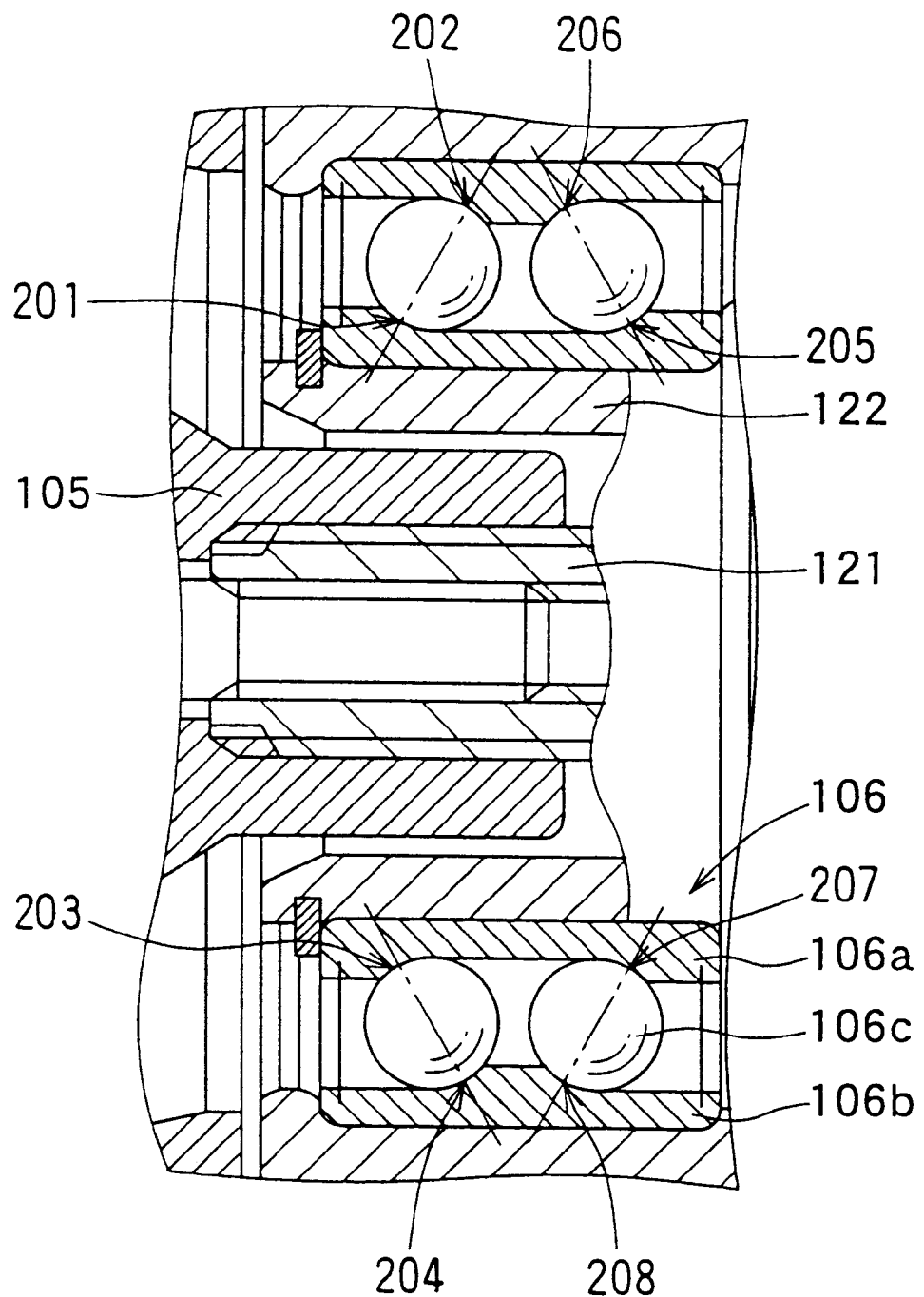
FIG. 5 is a partial enlarged view of FIG. 4.
Figure 6:
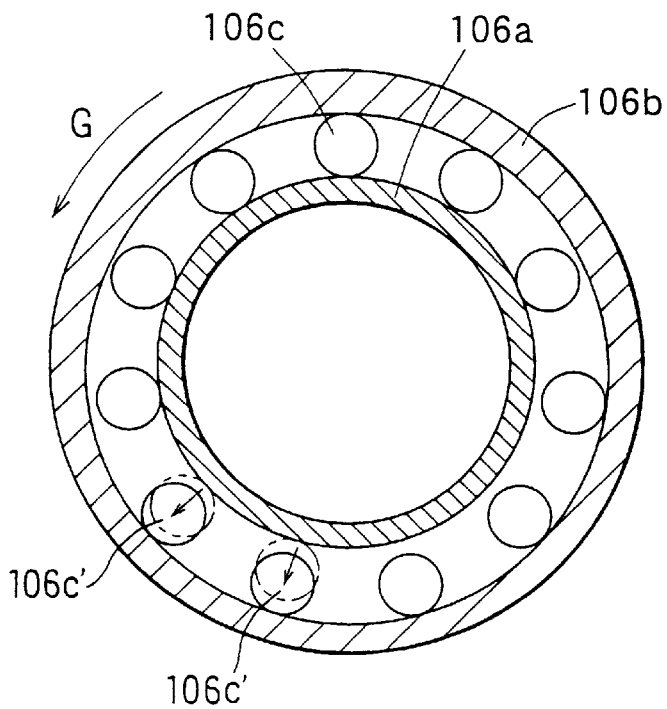
FIG. 6 is a cross-sectional view taken along line VI—VI in FIG. 4.
Figure 7:
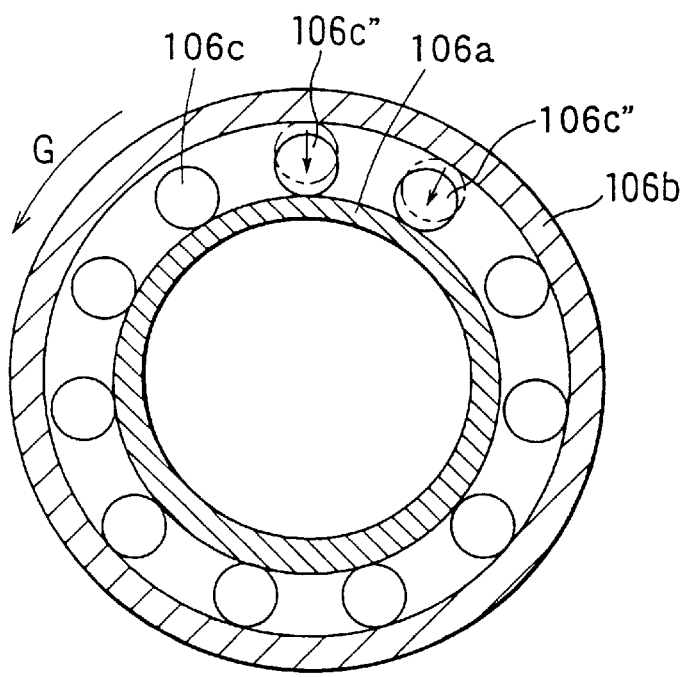
FIG. 7 is a cross-sectional view taken along line VII—VII in FIG. 4.

As shown in FIG. 3, first and second raceway surfaces 31b and 31c of the inner race 31 are formed to have larger radiuses of curvature than the radius of ball 33, so that the ball 33 contacts the inner race 31 at first and second contact points 31d and 31e. Similarly, first and second raceway surfaces 32b and 32c are formed to have larger radiuses of curvature than the radius of ball 33, so that the ball 33 contacts the outer race 32 at first and second contact points 32d and 32e. Here, the first and second raceway surfaces 31b, 31c, 32b and 32c have different center of curvatures. Further, these raceway surfaces 31b, 31c, 32b and 32c are formed such that a contact angle α is about 20 degree.

First contact points 31d, 32d of the inner and outer races 31, 32 are located at one side (left side in FIGS. 2 and 3) with respect to radial central line A, and second contact points 31e, 32e are located at the other side (right side in FIGS. 2 and 3) with respect to the radial central line A. Here, the radial central line A extends through the center of the ball 33 in the radial direction of the bearing 3.

Next, the operation of this embodiment will be explained. When an electric current is not supplied to the electromagnetic coil 5, the elastic member 9 retains the armature 8 to have the predetermined gap with respect to the friction surface 2a of rotor 2. Thus, the rotational force from the engine is transmitted to the rotor 2 only, through the V-belt 110 and the pulley 1, and is not transmitted to the armature 8 and the hub 12. As a result, the rotor 2 idles on the bearing 3, and the compressor 120 does not operate.

When the electric current is supplied to the electromagnetic coil 5, the electromagnetic force of the coil 5 attracts the armature 8 toward the rotor 2 against the spring force of the elastic member 9, so that the armature 8 couples to the rotor 2. Thus, the rotation of the rotor 2 is transmitted to the shaft 121 of the compressor 120 through the armature 8, elastic member 9 and the hub 12 to operate the compressor 120. Here, the elastic member 9 absorbs the torque vibration of the compressor 120.

After that, when the supply of electric current is stopped, the electromagnetic force is eliminated, and the armature 8 returns to the original position by the spring force of elastic member 9, thereby stopping the operation of the compressor 120.

As described above, when the engine operates, whether the electromagnetic coil 5 is energized or not, the rotational force from the engine is always transmitted to the rotor 2 through the V-belt 110 and the pulley 1, so that the rotor 2 always rotates.

As shown in FIG. 1, an action line E of the tension D of the belt 110 axially deviates from the radial central line A of the bearing 3. In the bearing 3, slight gaps (about 40μ) are provided between the ball 33 and the inner and outer races 31, 32 in the radial direction. Thus, a moment caused by the tension D of the belt 110 makes the outer race 32 inline in the counter clockwise direction. Similarly, the pulley 1 and the rotor 2 are made to incline.

As described above, the bearing 3 is a single row, four contact point bearing, so that each ball 33 contacts the inner races 31 at two points, and also contacts the outer race 32 at two points. Thus, even when the outer race 32 slightly inclines, each ball 33 always contacts both inner and outer races 31, 32 at least at one point, respectively.

For example, when the outer race 32 slightly inclines in the counterclockwise direction, although top ball 33a in FIG. 1 detaches from the second raceway surface 31c of the inner race 31 and the first raceway surface 32b of the outer race 32, the top ball 33a contacts the first raceway surface 31b of the inner race 31 at the first contact point 31d and the second raceway surface 32c of the outer race 32 at the second contacting point 32e. Similarly, although a bottom ball 33b detaches from the first raceway surface 31b of the inner race 31 and the second raceway surface 32c of the outer race 32, the bottom ball 33b contacts the second raceway surface 31c of the inner race 31 at the second contact point 32e and the first raceway surface 32b at the first contact point 32d.

In this way, each ball 33 always contacts both inner and outer races 31, 32 at least at one point, respectively. Thus, noise caused by that the balls 33 falling due to gravity, as in the conventional bearing, is prevented.

Here, even when each ball 33 can contact the inner and outer races 31, 32 at two points respectively, if the balls 33 are arranged in double row as in the prior art, the following disadvantage occurs. That is, when the outer race 32 inclines, the outer race 32 is pushed toward the inner race 31 at one row side, and the outer race departs from the inner race 32 at the other row side. As a result, there arise gaps between the ball 33 and the inner and outer races 31, 32 at the other row side.

However, according to the present embodiment, since the balls 33 are arranged in single row, such gaps will not arise and each ball 33 always contacts both inner and outer races 31, 32 at least at one point, respectively.

Further, according to the present embodiment, grease is charged into the space 34 where the balls 33 are provided. The grease works as a cushion between the balls 33 and the inner and outer races 31, 32 to reduce the noise caused by collision between the balls 33 and the races 31, 32. Here, the space 34 to which the grease is charged is sealed by the oil-seal 36, so that the grease does not leak, thereby continuously reducing the noise.

When the action line E of the tension D of the belt 110 is completely identical to the radial central line A of the bearing 3, the outer race 32 is pushed vertically downwardly in FIG. 1 without inclining. As a result, at the bottom side in FIG. 1, a gap between the inner and outer races 31 and 32 expands. In this case, there arise gaps between the balls 33 and the races 31, 32 at the bottom side, so that, if the grease is not provided, the balls 33 collide with the races 31, 32 to induce a noise.

As is understood from this fact, the present invention is especially efficiently used in a rotary machine in which the action line E of the tension D of the belt 110 axially diverts from the radial central line A of the bearing 3. That is, when the outer race 32 inclines, each ball 33 contacts both inner and outer races 31, 32 at least one point respectively, thereby reducing the noise caused by the collision between the balls 33 and the races 31, 32.

(Modifications)

In the above described embodiments, radius of curvatures of the raceway surfaces 31b, 331c, 32b and 32c are constant. However, they may alternatively not be constant. For example, the radius of curvatures of the contact point portions may be a little larger than the radius of the ball 33, and radius of curvatures of other portions apart from the contact point portions may be larger than those of the contact point portions. Or, the radius of curvatures may continuously vary in the entire area of the raceway surfaces 31b, 31, 32b and 32c.

In the above described embodiments, the present invention is applied to an electromagnetic clutch. However, it is not restricted to this, it may alternatively be applied to other rotary machines. For example, the present invention may be applied to a rotation transmission which transmits a rotational force from an engine to a variable capacity compressor used in an automotive air conditioner and interrupts the transmission when the compressor is locked, and may be applied to a belt tension adjuster which adjusts the belt tension of an auxiliary machine for a vehicle, and the like.

What is claimed is:

1. A rotary machine comprising:

a rotation member;

a bearing installed in an inner periphery of said rotation member to rotatably support said rotation member; and a support member provided at an inner periphery of said bearing to support said bearing, wherein said bearing includes an inner race, an outer race, and a plurality of balls provided between said inner race and said outer race, at least one of the inner race and the outer race is held within a member made from a first material having a different coefficient of thermal expansion from the coefficient of thermal expansion of a material comprising the balls, said plurality of balls are arranged in single row, each of said plurality of balls contacts said inner race at two contact points when a force acting radially on said rotary machine is along a radial central line extending through the center of said balls in a radial direction of said bearing, and a gap is provided between each ball and each of the inner and outer races, such that the gap accommodates differences in expansion between the first material and the material comprising the balls, and when a force acting radially on said rotary machine is axially diverted from the radial central line, and said outer race inclines, each said ball contacts said inner race at at least one point, and contacts said outer race at at least one point.

2. A rotary machine according to claim 1, wherein said inner race and said outer race define raceway surfaces contacting said balls, and radius of curvatures of said raceway surfaces are larger than a radius of said balls at portions where said raceway surfaces contact said balls.

3. A rotary machine according to claim 1, wherein said bearing defines a space between said inner race and said outer race, where said balls are disposed, said space is sealed by a seal member, and charged with grease.

4. An electromagnetic clutch comprising:

an electromagnetic coil;

a rotor;

an armature selectively coupled to said rotor when said electromagnetic coil is energized;

a hub; and a bearing installed in an inner periphery of said rotor to rotatably support said rotor, wherein said bearing includes an inner race, an outer race, and a plurality of balls provided between said inner race and said outer race, at least one of the inner race and the outer race is held within a member made from a first material having a different coefficient of thermal expansion from the coefficient of thermal expansion of a material comprising the balls, said plurality of balls are arranged in single row, each of said plurality of balls contacts said inner race at two contact points when a force acting radially on said rotary machine is along a radial central line extending through the center of said balls in a radial direction of said bearing, and a gap is provided between each ball and each of the inner and outer races, such that the gap accommodates differences in expansion between the first material and the material comprising the balls, and when a force acting radially on said rotary machine is axially diverted from the radial central line, and said outer race inclines, each said ball contacts said inner race at at least one point, and contacts said outer race at at least one point.

5. An electromagnetic clutch according to claim 4, wherein said inner race and said outer race define raceway surfaces contacting said balls, and radius of curvatures of said raceway surfaces are larger than a radius of said balls at portions where said raceway surfaces contact said balls.

6. An electromagnetic clutch according to claim 4, wherein said bearing defines a space between said inner race and said outer race, where said balls are disposed, said space is sealed by a seal member, and charged with grease.

* * * * *